Patented May 8, 1923.

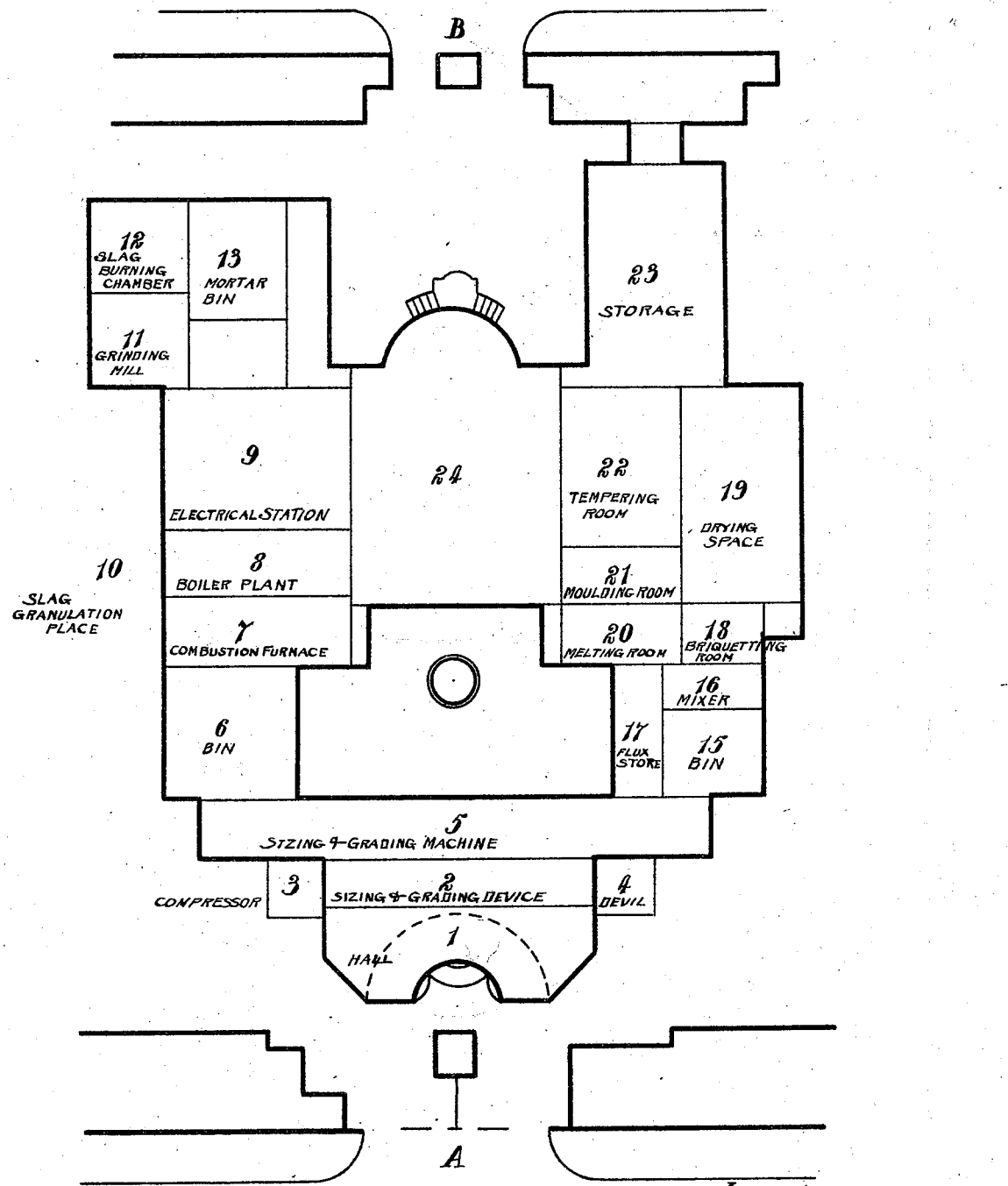

1,454,082

UNITED STATES PATENT OFFICE.

GUSTAV SCHLÖSSER, OF OBERSCHONEWEIDE, NEAR BERLIN, GERMANY.

METHOD OF UTILIZING DOMESTIC AND INDUSTRIAL GARBAGE AND OTHER REFUSE.

Application filed January 27, 1921. Serial No. 440,546.

*To all whom it may concern:*

Be it known that I, GUSTAV SCHLÖSSER, a citizen of the German Republic, residing at Oberschoneweide, near Berlin, Germany, have invented certain new and useful Improvements in Methods of Utilizing Domestic and Industrial Garbage and Other Refuse; and I do hereby declare that the following is a full, clear, concise, and exact description of the invention, such as will enable others skilled in the art to which it appertains to make and use the same.

According to the method forming the subject-matter of this invention the domestic and industrial refuse, as well as other refuse, including such of factories and rubbish, is first subdivided into certain main-components which, then, are separately treated whereby great economical advantages are obtained and considerable values are turned into account for the benefit of the generality.

With the utilization of refuse and the like as hitherto practiced the refuse, etc., is first graded and sized upon a suitable machine by workmen who select comparatively valuable parts and either burn the other parts or disposed of in some other way. The parts to be burned are introduced into an appropriate furnace supplied with an adequate quantity of oxygen whereby said parts are burned. The thus produced heat is utilized for the generation of steam and electrical energy.

The incombustible residues which contain about 50 per cent of slag are sometimes utilized for filling up streets and the like, but as such a material is but seldom required for such purpose, the residues accumulate and form heaps, which disfigure the country. Furthermore, great economical values lie buried in them. Refuse combustion furnaces are expensive and uneconomical, and only big cities have made use of them from hygienic reasons.

How great the quantities of slaggy residues are which are to be dealt with in the combustion of refuse appears from the fact that the refuse of a city of, say, one million inhabitants amounts daily to about 600,000 kilograms, which contain about 300,000 kilograms of slaggy residues; that is 109,500,000 kilograms in a year.

This kind of disposing of the refuse is connected with the great disadvantage that the refuse is introduced into the furnace in unsized and ungraded state, especially without having been subdivided according to the calorific value of its components. This renders the working of the furnace greatly uneconomical because the fine parts which are soon completely burned cover and enclose the coarse parts, as does also the street-rubbish, whereby the oxygen is prevented from getting access to the coarse parts and rendering useful their calorific power. If the combustion-air is introduced into the furnace by blower or the like, fine parts are carried away into the flues and the chimney, decrease the sectional area of these parts, and pollute the neighbourhood of the refuse combustion plant. Furthermore, the flue-dust resulting from the combustion of the said fine refuse parts deposits, for instance, upon boilers, heating-tubes, and the like, and diminishes the heating-effect of these parts which means another loss.

How large the amount of flue-dust from a refuse combustion plant is appears from the fact that is the daily quantity of refuse amounts to about 600,000 kilograms, then 600,000 kilograms of flue-dust deposit in the flues and the like, and very much labor and great costs are entailed by removing that dust from those parts.

All these severe drawbacks are obviated by the present improved method which proceeds as follows:

The total of the refuse, rubbish, and the like, is before being otherwise worked, subdivided into bulky parts, coarse parts, and fine parts.

Then every sort is separately treated. Supposing, the refuse and the like is, that of a city where chiefly brown-coal is burned, the refuse consists of about 62% of coarse refuse, about 33% of fine refuse, and about 5% of bulky refuse (old baskets, trunks, buckets, carpet-pieces, and the like). The coarse refuse contains about from 80 to 85% of combustible or partly combustible parts, such as half-burned coal and coke, paper, wool, wood, rags, vegetable and animal substances, also from 15 to 20% of iron parts, pieces of china and glass, slag, and so on. The fine refuse contains but very little utilizable parts of calorific value, and consists of various ingredients the chemical constituents of which should always be determined by analysis. As an example one specimen was found by analysis to contain about 25% of sulfuric acid, 21% of lime, 7% of iron, 2% of copper, 10% of aluminum-oxide, 4% of sulfate of magnesium, and 3% of water. This is merely an example.

The refuse is treated and utilized, corresponding to its composition, as follows:

The coarse refuse is burned with aid of a supply of oxygen and the heat produced is utilized for the generation of steam and electric energy.

It is obvious that the combustion of the coarse refuse which is free of all parts, such as ashes and the like that impedes the combustion, proceeds considerably better, and that correspondingly more heat and steam and electrical energy is produced as if unsized and ungraded refuse is burned. Furthermore, it is obvious that the bulky parts extremely impede the formation of slag. But although the best possible combustion is obtained, still residues amounting to about 60% of the coarse refuse remain in the form of slag.

Owing to the separation of the bulky parts, as well as of the fine parts, the heat produced by and during the combustion of the coarse refuse-parts can easily act upon the meltable parts of the same, and the remaining slag forms a compact mass which, owing to its particular composition and to the formation of silicates is excellently suited to act as an agent in the manufacture of mortar.

The uncombustible slaggy residues which have sintered are granulated, mixed with a suitable flux, such as lime, catalyzers, and the like, and are ground. The pulverulent substance obtained is subjected to an appropriately higher temperature for converting the silicates into a non-refractory form, after having cooled down, an excellent agent for the manufacture of mortar.

The less sintered slaggy residues are mixed either with this mortar or with lime and are moulded in presses to form bricks which finally are hardened without or with the application of steam-pressure.

In order to make my invention more clear, I refer to the accompanying drawing which shows, by way of example and in diagrammatical representation, a plan of a refuse-combustion-plant constructed according to my invention. All phases of the procedure proceed mechanically or automatically and in a completely hygienic manner free from objection.

The refuse is conveyed to the plant from the street A and delivered at the hall 1 from which it is supplied to the sizing and grading device 2 where it is subdivided into bulky parts and refuse proper. The metal-parts of the former are reduced in bulk by means of a suitable device 3, such as a compressor or baler, and are then glowed in the combustion-chamber of the plan in a hygienically perfect manner.

The combustible bulky parts, such as basket-rests, carpet-pieces, and the like, are torn to pieces by means of a so-called devil or a similar machine (4) and are admixed to the coarse parts of the refuse.

The refuse which has been freed from the bulky parts is subdivided by a sizing and grading machine 5 into coarse parts and fine parts; each of these two kinds of refuse is separately treated upon a special way and in a special manner.

The coarse parts are conducted to a bin 5 in which they are accumulated and stored to form a reserve for an eventual interruption of supply of this kind of refuse. From the bin 5 the refuse is conducted to the combustion furnaces 7 which are connected with the boiler-plant 8 where the heat produced is utilized for the generation of steam which then in its turn is employed for the generation of electrical energy in the electrical central-station 9. Part of the electric current produced is consumed for and in the refuse-combustion plant, whereas the other part is conducted to the city-net. The unburnt slag-remainders are cooled upon the slag granulation place 10, then mixed and ground in the mill 11, then burned in the burning chamber 12, then conveyed to and into the mortar bin 13, and finally conveyed away to brick-works to be worked up into bricks.

The fine refuse is also conveyed to and into a bin 15 where it is stored. When further treated, it is first mixed with flux-means such as lime, coke, silicic acid, aluminium, and the like, contained in the bin 17; then the mixture is briquetted in the briquetting-room 18; then the briquettes are dried in the drying-space 19, and finally melted in the melting-chamber 20. The liquid glowing mass is moulded in the moulding-room 21 and the pieces produced are tempered in the tempering-room 22, 23 is the store-space for the finished stones or bricks from which they are transported off to the building-places.

When moulding the glowing mass stone-pieces may be added to and introduced in it in order to obtain, without any impediment to the structure of the stones or bricks, certain irregularities in order to prevent the stones or bricks from becoming smooth when in use. If colored stone-pieces are added, which may be of different colors, the stones or bricks obtained resemble vari-colored granite and are excellently suited for decorative purpose in connection with buildings.

The water necessary for cooling the furnace during the melting operation is thereby heated to about 50 or 60 degrees C. and may be utilized in a bathing-establishment, or in a laundry, or for heating rooms and offices, or the like.

Thus, according to the novel method described, the refuse rubbish, and the like, which is supplied at A or from any other place is completely utilized and changed and converted into high-grade valuable products which are perfectly unobjectionable also from the hygienic point of view and are carried away in finished state at B. The whole is a self-contained plant which is of very high value for the economy of the city possessing it.

Having now described my invention, what I desire to secure by a patent of the United States is:

That method of treating city refuse which consists in removing the bulky portion of said refuse, grading the remainder into coarse combustible and fine relatively incombustible portions, mixing the fine portion with a suitable flux, briquetting the mixture and drying the briquettes, burning the coarse portion and utilizing the heat therefrom to melt the briquettes, running the molten briquettes in molds, and finally tempering the moulded pieces.

In witness whereof I have hereunto set my hand.

GUSTAV SCHLÖSSER.